UNITED STATES PATENT OFFICE.

JAMES TAYLOR, OF WEST COWES, ISLE OF WIGHT, ENGLAND.

REMEDY FOR LIVER COMPLAINT, &c.

SPECIFICATION forming part of Letters Patent No. 419,802, dated January 21, 1890.

Application filed March 5, 1889. Serial No. 302,019. (No specimens.) Patented in England January 24, 1889, No. 1,344.

*To all whom it may concern:*

Be it known that I, JAMES TAYLOR, a subject of the Queen of Great Britain, and a resident of West Cowes, Isle of Wight, in the county of Hants, England, have invented certain new and useful Improvements in a New Mixture for Liver Complaint and Scorbutic Eczema, (for which I have obtained a patent in Great Britain, No 1,344, dated January 24, 1889,) of which the following is a full, clear, and exact specification.

My invention consists in the following herbs, combined in the proportions stated, namely: barberry wood, (*Berberis vulgaris*,) twenty-five parts; vervain, (*Verbena officinalis*,) twenty-five parts; wood-betony, (*Betonica officinalis*,) twenty-five parts, and wood-sage, (*Salvia agristis*,) twenty-five parts. These herbs are each boiled separately in water, in the proportion of one ounce of each herb in one pint of water, or a less quantity of water, according to the desired strength, and then the juice obtained therefrom is mixed in the above quantities, which makes an excellent remedy against all liver complaints and scorbutic eczema.

One-half to a full wine-glass of this mixture is taken every other morning before taking food.

Having fully described my invention, what I claim, and desire to secure by Letters Patent of the United States, is—

The medical compound consisting of the mixture of the juice of the following herbs, viz: barberry wood, vervain, wood-betony, and wood-sage, in the proportions as above stated, for the purpose set forth.

In testimony that I claim the foregoing I have hereunto set my hand.

JAMES $\overset{\text{his}}{\times}$ TAYLOR.
<div style="text-align:center">mark</div>

Witnesses:
 H. DAMANT,
 ALTERSTONE DAMANT.